United States Patent [19]

Groff

[11] 4,207,374

[45] Jun. 10, 1980

[54] FLAME-RETARDANT FILM

[75] Inventor: Gaylord L. Groff, North St. Paul, Minn.

[73] Assignee: Minnesota Mining and Manufacturing Company, St. Paul, Minn.

[21] Appl. No.: 902,916

[22] Filed: May 5, 1978

[51] Int. Cl.$^2$ .................. C09K 3/28; B32B 27/36; B32B 27/38; B32B 27/40

[52] U.S. Cl. .................. 428/261; 428/349; 428/354; 428/355; 428/413; 428/482; 428/483; 428/921

[58] Field of Search ............... 428/921, 920, 413, 414, 428/425, 480, 482, 483, 343, 349, 354, 355, 261

[56] References Cited

U.S. PATENT DOCUMENTS

| | | | |
|---|---|---|---|
| 3,027,279 | 3/1962 | Kurka et al. | 428/324 X |
| 3,061,492 | 10/1962 | Singleton et al. | 428/921 X |
| 3,158,494 | 11/1964 | Elkvar et al. | 428/480 X |
| 3,336,153 | 8/1967 | Juda | 428/215 |
| 3,515,578 | 6/1970 | Tomita et al. | 428/921 X |
| 4,034,136 | 7/1977 | Wright et al. | 428/921 X |
| 4,061,826 | 12/1977 | Petras et al. | 428/921 X |
| 4,123,575 | 10/1978 | Wesch et al. | 428/414 X |
| 4,152,320 | 5/1979 | Shapiro et al. | 428/921 X |

*Primary Examiner*—Harold Ansher
*Attorney, Agent, or Firm*—Cruzan Alexander; Donald M. Sell; Gerald F. Chernivec

[57] ABSTRACT

A flexible, fire retardant electrically insulating film material comprising a thermoplastic film backing and a thermoset fire retardant coating on one or both surfaces of the backing. Preferably, a pressure sensitive adhesive coating is applied to either the film backing or overcoated on the thermoset coating.

15 Claims, No Drawings

FLAME-RETARDANT FILM

BACKGROUND OF THE INVENTION

This invention relates to a film material useful in the electrical industry which is fire or flame retardant. More particularly, the invention is directed to the use of a flame-retardant coating in conjunction with a backing film, and, in a preferred embodiment, a pressure sensitive adhesive layer.

Electrically insulative films, often in tape form, i.e., contained on a core, are utilized to wrap electrical components therewith. In many instances, the tapes contain a pressure sensitive adhesive thereon for obvious benefits. Such tapes typically must have characteristics such as insulation qualities relative to electrical shock, temperature stability, moisture and chemical resistance, toughness, etc. In recent years, it has become increasingly important to include flame retardancy as a desirable quality, such that any flame or fire produced by a shorting out of the electrical component enclosed by the tape, or by an outside source, will not be propagated by the tape itself.

In the past, various schemes have been proposed to provide fire retardancy to electrical tapes. In tapes containing a pressure sensitive adhesive, one common method is to include fire retardant components in the adhesive itself. One such system is disclosed in U.S. Pat. No. 4,061,826, wherein a halogenated compound is utilized in conjunction with a pressure sensitive adhesive to achieve flame retardancy. However, it has been ascertained that in such systems, the concentration of additives necessary to achieve satisfactory flame retardancy must either be so great that the basic adhesive properties are thereby degraded to an unacceptable level, or other functional deficiencies are noted. Similarly, in U.S. Pat. No. 3,515,578, there is disclosed the addition of a phosphate component to a pressure sensitive adhesive to provide fire retardance thereto, but again, the flame retardancy thereof is less than optimum, and the additive also has a softening effect on the adhesive itself, thereby rendering the characteristics of same somewhat less than optimal.

Furthermore, fire retardant adhesives do not prevent conventional thermoplastic backings from dripping when contacted by flame, which can cause a removal of the insulation from an electrical part, and most always allows for continuation of a fire.

Another approach has been to utilize intumescent coatings on backings to provide fire retardant tapes therewith, as is disclosed in U.S. Pat. No. 3,336,153. However, in many instances intumescent materials require excessive thicknesses to be effective, and are water sensitive, and therefore are inapplicable for electrical tapes.

Still another approach has been to provide fire retardant components in the film backing itself, with or without utilization of an adhesive system which is proposed to be flame retardant. However, this approach provides inadequate fire retardancy because the necessary high loading of fire retardant components makes processing of the backing difficult, if not impossible.

It has now been ascertained that by the utilization of a thermoset resin layer which is fire retardant, an electrically insulating film can be produced which contains excellent fire retardancy without reducing the electrical, physical and chemical properties of the film which are so necessary for functionality thereof. The resinous layer can be simply applied to a thermoplastic support film, and when a pressure sensitive adhesive is utilized, the resinous layer can be either interposed between the thermoplastic support film and the adhesive or can be applied to the backside of the support film. The resinous layer can be utilized with prior art electrical tapes which contain adhesives with fire retardant additives therein.

SUMMARY OF THE INVENTION

In accordance with the invention, there is provided a flexible, electrically insulating fire retardant film material comprising a flexible thermoplastic film backing having a coating on at least one surface thereof, the coating comprising a thermoset fire retardant resin composition. Preferably, a pressure sensitive adhesive is also applied, either on the backside of the film backing or as an overcoat on the thermoset coating.

DETAILED DESCRIPTION OF THE INVENTION

The particular support film utilized for the preparation of the film material of my invention can be any of those conventionally utilized in conjunction with electrical equipment. A typical example of support films which have had widespread use in this area are the polyester materials. However, it has been ascertained that my invention does not relate to the utilization of any specific film backing, and in essence any conventional flammable thermoplastic backing can be utilized with the resinous coating to impart flame retardance thereto.

The resinous fire retardant thermosetting compositions useful herein include thermosetting resin systems which are capable of curing to their thermoset condition at a temperature sufficiently low to avoid distortion or degradation of the backing material. In the case of polyester, this temperature is about 130° C. In addition, a thermoset film of the resinous composition must itself be sufficiently flexible to avoid a substantial increase in stiffness to the composite structure, i.e., a thermoset resinuous coating on the flexible support film. Furthermore, the resin system in its thermoset condition must have sufficient adhesion to the flexible support film to avoid the peeling thereof from the support film. In addition, the coating must not substantially affect the electrical properties of the backing, and therefore should have an insulation resistance of at least about $10^6$ megohms; should be substantially non-corrosive to metals, so as to avoid degradation of the electrical components in which the tape will be utilized; must be resistant to common solvents, e.g., ketones and toluene; and must be compatible with the film backing utilized, i.e., they must not adversely chemically interact with the backing material. When a pressure sensitive adhesive system is utilized in conjunction therewith, the thermoset resin system again must be compatible with the adhesive system.

An exemplary resin system is based on a fire retardant polyester/epoxy resin combination, and is based on the electrical insulating resin disclosed in U.S. Pat. No. 3,027,279. As disclosed therein, the resin system is based on a branch-chain acid-terminated polyester in conjunction with an epoxy compound which is readily reactive with the polyester to provide a resin having excellent electrical insulating properties. When such resins are manufactured using conventional halogenated materials, which have been found to provide flame retardancy, an excellent fire retardant system is provided which, when applied to the backing of an electrical tape, imparts excellent flame retardancy thereto without sacrificing any of the functionality of the tape itself.

Another exemplary fire retardant resin coating is based on a polyurethane system, wherein a halogenated polyol is utilized to prepare the polyurethane. In addition, non-flame retardant polyester/epoxy-based resin systems can be utilized wherein fire retardancy is rendered thereto by the inclusion of inert particulate halogenated materials.

The resin systems can be simply coated onto the support film followed by curing thereof to a thermoset condition. Coating thicknesses of from about 0.5 to about 3.0 mils have been found to perform satisfactorily. Higher coating thicknesses may tend to provide some decrease in flexibility of the composite structure, and thinner coatings tend to reduce the flame retardancy below optimum.

Such a composite structure can be utilized in, for example, transformers, as winding coverings therein, phase separators, etc. When a tape with pressure sensitive characteristics is desired, conventional adhesive systems for use in electrical tapes are similarly useful in my invention. Adhesive systems such as acrylics, rubber/resin, etc. whether flame retardant or not, will function in the invention. Optimally, of course, it is preferred to utilize a flame retardant adhesive system such as that disclosed in U.S. Pat. No. 4,061,826.

The exact location of the thermoset fire retardant resin layer in the composite, when a pressure sensitive adhesive system is utilized, has been determined to be relatively unimportant. In other words, same may be placed on the backside of the film support, with the adhesive system being applied to the opposite side thereof, or it may be interposed between the film support and the pressure sensitive adhesive system. When the thermoset resin coating is applied on the backside of the film support, a more print-receptive surface is available, if such is desired. When the thermoset coating is interposed between the support and the pressure sensitive adhesive layer, the delamination resistance of the composite is increased. Furthermore, the thermoset coating can be applied to both sides of the thermoplastic film to maximize flame retardancy.

The invention will now be more specifically described by the use of the following non-limiting examples, wherein all parts are by weight unless otherwise specified.

EXAMPLE 1

In accordance with the teachings of U.S. Pat. No. 3,027,279, a stainless steel kettle equipped with a packed cooling column leading to a condenser was charged with 28.1 parts of adipic acid, 22.7 parts of tetrabromophthalic anhydride (halogenated to impart fire retardancy), 14.2 parts of propylene glycol, 2.4 parts of trimethylol propane and 0.01 part of anhydrous sodium acetate (catalyst). The temperature was slowly raised using a heated oil bath to 230° C., and heating was contained for several hours, during which time the water of condensation formed was removed by a stream of nitrogen, until the acid number approached 58. A vacuum of 10 mm of mercury was applied and heating was continued until an acid number of 53 was reached. A branched-chain, acid-terminated polyester was thereby formed.

A mixture of 67.4 parts of this polyester and 9.4 parts of Epon 828, tradename for a liquid epoxy resin, was diluted to 77 percent solids with toluene and heated under reflux conditions for 4 hours, at which time the bulk viscosity of the partially-reacted mixture was 2000 centipoise at 25° C.

A coating composition was then prepared by mixing the following ingredients with a propeller mixer at medium speed:

69.40 parts Brominated polyester/epoxy from above 14.85 parts Epi Rez 2392, tradename for a brominated epoxy resin solution (70% solids in toluene)

8.33 parts 50/50 by weight blend of antimony trioxide and Epon 828

1.50 parts Trimellitic anhydride, a crosslinking agent 4.79 parts Methyl ethyl ketone 1.04 parts Cordova ATC-3, tradename for a chrome octoate-based catalyst from Cordova Chemical 0.50 part SR-82 Silicone Resin, tradename for a silicone resin wetting agent After mixing for 10 minutes, the viscosity of the solution was approximately 1,000 centipoise and the gel time on a 250° F. hot plate was determined to be approximately 60 seconds. The solution was coated onto 1 mil polyethylene terephthalate film by a reverse roll coater using a 2 mil wet orifice, the coated film then being transported through a 3 zone oven utilizing zone temperatures of 150° F., 260° F., and 260° F. The resistance time in each of the three zones was approximately 1 minute, 1.5 minutes, and 1.5 minutes respectively, with the lower temperature first zone being used to drive off the solvent in the coating.

After this temperature exposure, the dry coating, approximately 1.2 mils in thickness, was smooth, shiny, very flexible, and dry to the touch. The coating was not solvated by methyl ethyl ketone or toluene. The bond to the polyester backing was excellent since the coating could not be removed by applying a high tack pressure sensitive tape to the coating and attempting to separate same from the polyester film.

A 1 inch wide vertical strip was ignited with a Bunsen burner, whereupon the flame did not propagate up the strip and extinguished in approximately 2 seconds. Surprisingly, there was no dripping as typically occurs with prior art fire retardant tapes. Conversely, when a strip of uncoated 1 mil polyester film was ignited it was completely burned with melting and dripping occurring.

The polyester film side of the structure, i.e., the side opposite the resin coating was then squeeze roll coated with a thin coat of a 5 percent by weight solution of polyisoprene rubber dissolved in toluene, as disclosed in U.S. Pat. No. 3,188,266. The coating was dried on a hot can at 200° F., and then subjected to low intensity ultraviolet radiation to thereby bond the isoprene to the polyester film. This coating acted as a primer for the subsequently applied pressure sensitive adhesive.

The side of the support containing the thermoset fire retardant coating thereon was then squeeze roll coated with a 5 percent by weight solution of urethane low adhesion backsize in accordance with U.S. Pat. No. 2,532,011, and air dried. During the same operation, a phenolic resin-cured rubber-resin adhesive system prepared in accordance with Example 3 of U.S. Pat. No. 3,718,495 was knife coated over the primed side of the support utilizing a 7 mil orifice. The adhesive was then dried in the aforementioned oven with temperatures of 120° F., 180° F., and 235° F., and residence times were approximately 2 minutes in each zone. The thickness of the dry adhesive approximated 1.5 mils.

The foregoing tape was wound in jumbo form and then conventionally slit into one inch thick rolls. Pertinent test results which were obtained by utilization of the tape are as follows:

| Adhesion to steel, as determined per ASTM D1000 for PSA electrical tape | |
|---|---|
| fresh | 49 oz/in |
| aged 1 week at 120° F. | 51 oz/in |
| Adhesion to backing, as determined per ASTM D1000 | |
| fresh | 14 oz/in |
| aged 1 week at 120° F. | 37 oz/in |
| Insulation resistance, per ASTM D1000 | $1.5 \times 10^8$ megohms |
| Flammability test, in accordance with Underwriter Laboratories Spec. 510 | |
| 1st ignition | 6 second burn |
| 2nd ignition | 5 second burn |
| 3rd ignition | 2 second burn |
| 4th ignition | 1 second burn |
| 5th ignition | 0 second burn |

When tested on aluminum vapor coated polyester capacitors per Underwriter Laboratories Spec. 1414, the tape was considered satisfactory.

The foregoing tests illustrate that the tape has excellent and stable adhesive properties, good electrical properties and excellent fire retardant properties.

EXAMPLE 2

A 1.2 mil biaxially oriented polypropylene film, which has been corona treated on both sides, was knife coated at a 3 mil orifice with the resin solution of Example 1. The coating was then dried for 1.5 minutes at 150° F. and cured at 250° F. for 3 minutes, whereby a smooth, shiny, dry, flexible coating resulted with a dry coating thickness of 1.5 mils.

Over the fire-retardant coating was then knife coated a layer of the pressure sensitive adhesive of Example 1, utilizing a 7 mil coating orifice. The adhesive layer was then dried at 150° F. for 1.5 minutes and then at 230° F. for 3 minutes.

The polypropylene film side of the structure was then coated as per Example 1 with the low adhesion backsize.

The tape was conventionally slit into ¾ inch wide strips and wound on one inch diameter cores. One roll of the tape was aged for 1 week at 120° F., following which the adhesion qualities thereof were measured as follows:

| Adhesion to steel per ASTM D1000 for PSA electrical tape | |
|---|---|
| fresh tape | 72 ounces per inch |
| tape aged 1 week at 120° F. | 81 ounces per inch |

The insulation resistance of the tape was determined per ASTM D1000 on 1 inch wide strips of the tape and ascertained to be $2 \times 10^8$ megohms.

Pursuant the UL-510 flammability test, the fire retardant properties were determined as follows:

| Ignition 1 | 17 seconds |
|---|---|
| Ignition 2 | 2 seconds |
| Ignition 3 | 17 seconds |
| Ignition 4 | 0 seconds |
| Ignition 5 | 0 seconds |

EXAMPLE 3

The following resin composition was knife coated at a 3 mil coating orifice onto 1 mil biaxially oriented polyethylene terephthalate film:

| Mondur MR isocyanate, tradename for a polymeric isocyanate from Monsanto | 140 parts |
|---|---|
| Polypropylene glycol | 125 parts |
| PHT4, tradename for a brominated diol from Velsicol Chemical Co. | 249 parts |
| A 50/50 by weight mixture of antimony trioxide and Epon 828 | 51 parts |

This mixture provided a 1.07:1 NCO/OH ratio.

The coating was then allowed to stand for 1 hour at 24° C. to thereby allow the coating to prepolymerize, following which the coating was cured for 15 minutes at 250° F. The resultant coating was of 3 mils thickness, smooth, shiny, flexible, and well adhered to the polyester film base.

The polyester film side of the construction was then hand coated with the urethane backsize of Example 1.

The fire retardant polyurethane-coated side of the structure was then overcoated with the pressure sensitive adhesion system of Example 1, utilizing a knife coater and a 7 mil orifice. The adhesive was dried for 1.5 minutes at 150° F. and 3 minutes at 230° F., resulting in an adhesive thickness of 1.5 mils. The tape was then slit into ¾ inch wide strips and wound on one inch diameter cores. Similar to the preceding examples, a sample of the tape was aged for 1 week at 120° F. The adhesion properties of the tape were as follows:

| Adhesion to steel per ASTM D1000 | |
|---|---|
| fresh tape | 135 oz/in |
| tape aged for 1 week at 120° F. | 136 oz/in |

The insulation resistance, determined pursuant ASTM D1000 was found to be $1 \times 10^8$ megohms.

The fire retardant properties of the tape, when again tested per UL-510 were as follows:

| 1st ignition | 7 seconds |
|---|---|
| 2nd ignition | 6 seconds |
| 3rd ignition | 1 second |
| 4th ignition | 0 seconds |
| 5th ignition | 0 seconds |

EXAMPLE 4

Pursuant the teachings of U.S. Pat. No. 3,027,279, a polyester/epoxy resin was prepared as follows:

A stainless steel kettle equipped with a packed cooling column leading to a condenser was charged with 547 parts of adipic acid, 224 parts of isophthalic acid, 317 parts of propylene glycol, 43 parts of trimethylolpropane and 1.7 parts of triphenyl phosphite. The temperature was slowly raised using a heated oil bath to 230° C., and heating was continued for several hours, during which time the water of condensation was removed by a stream of nitrogen, until the acid number reached 80. A vacuum of 10 mm or below was applied, otherwise continuing the same reaction conditions, until an acid number of 55 was reached.

This branched-chain, acid-terminated polyester was then mixed using 475 parts of the polyester and 103 parts of liquid epoxy resin ("Epon 828") diluted to 90% solids with toluene, and then heated at reflux for 4 hours, at which time the bulk viscosity of the partially-reacted mixture was 13,000 centipoises at 65° C. To this was added toluene to reduce the solids content to 78 percent, the viscosity then approximating 5000 cp. at 23° C.

A coating composition was then prepared for knife coating onto a 1 mil biaxially oriented polyethylene terephthalate film at a 3 mil coating orifice by mixing:

| | |
|---|---|
| Polyester/epoxy solution as prepared above | 100 parts |
| Epon 828 | 9 parts |
| A 50/50 mixture of Epon 828 and antimony trioxide | 14 parts |
| Trimellitic anhydride solution, 25 percent solids in methyl ethyl ketone | 32 parts |
| FR-300, tradename for decabromodiphenyl oxide, an inert powder from Dow Chemical | 40 parts |
| Cordova ATC-3 | 2 parts |

The solution was prepared by slowly mixing the particulate FR-300 into the other ingredients by use of a high speed propeller mixer. Following coating, same was dried for 1.5 minutes at 150° F. and cured at 250° F. for 10 minutes. A tough, dry, flexible, well-cured coating resulted having a thickness approximating 1.6 mils.

The polyester film side of the construction was then coated with a thin layer of the urethane low adhesion backsize of Example 1 by hand applying same to the polyester surface. The side containing the fire-retardant thermoset coating was then knife coated with the pressure sensitive adhesive of Example 1 at a 7 mil coating orifice, following which the adhesive was dried for 1.5 minutes at 150° F. and 3 minutes at 250° F., resulting in a dry adhesive thickness of 1.1 mils.

The tape was slit into ¾ inch wide strips and wound onto 1 inch diameter cores. One roll of this tape was aged for 1 week at 120° F., after which the adhesion properties thereof were determined as follows:

| Adhesion to steel per ASTM D1000 | |
|---|---|
| fresh tape | 53 oz/in |
| aged 1 week at 120° F. | 49 oz/in |

The insulation resistance was determined per ASTM D1000 to be $2 \times 10^8$ megohms.

The fire retardant properties, when again tested per UL-510 were as follows:

| | |
|---|---|
| 1st ignition | 3 seconds |
| 2nd ignition | 4 seconds |
| 3rd ignition | 1 second |
| 4th ignition | 0 seconds |
| 5th ignition | 0 seconds |

What is claimed is:

1. A flame-retardant, flexible, electrically insulating film material comprising a flexible thermoplastic film backing having a flexible coating on at least one surface thereof, said coating comprising a thermoset fire-retardant resin composition.

2. The film material of claim 1 wherein said resin composition comprises a fire retardant reaction product of a branch-chain acid-terminated polyester and at least one epoxy compound.

3. The film material of claim 1 further containing a second fire retardant coating on the backside of said film backing, said second fire retardant coating comprising a thermoset fire retardant resin composition.

4. The film material of claim 3 wherein each of said fire retardant resin compositions is comprised of a fire retardant reaction product of a branch-chain acid-terminated polyester and at least one epoxy compound.

5. The film material of claim 1 wherein said film backing is a polyester.

6. A flame-retardant, flexible, electrically insulating pressure sensitive tape comprising a flexible thermoplastic film backing having a pressure sensitive adhesive coating on one surface thereof, and having a flexible fire retardant coating on the other surface thereof, said fire retardant coating comprising a thermoset fire retardant resin composition.

7. The tape of claim 6 wherein said resin composition comprises a fire retardant reaction product of a branch-chain acid-terminated polyester and at least one epoxy compound.

8. The tape of claim 6 wherein said film backing is a polyester.

9. The tape of claim 6 wherein said pressure sensitive adhesive is fire retardant.

10. A flame retardant, flexible, electrically insulating pressure sensitive tape comprising a flexible thermoplastic film backing having a fire retardant coating on one surface thereof, said coating comprising a thermoset fire retardant resin composition, and overlying said coating a second coating comprising a pressure sensitive adhesive.

11. The tape of claim 10 wherein said resin composition comprises a fire retardant reaction product of a branch-chain acid-terminated polyester and at least one epoxy compound.

12. The tape of claim 10 further containing a second fire retardant coating on the backside of said film backing, said second fire retardant coating comprising a thermoset fire retardant resin composition.

13. The tape of claim 12 wherein each of said fire retardant resin compositions is comprised of a fire retardant reaction product of a branch-chain acid-terminated polyester and at least one epoxy compound.

14. The tape of claim 10 wherein said film backing is a polyester.

15. The tape of claim 10 wherein said pressure sensitive adhesive is fire retardant.

* * * * *